(12) United States Patent
Shacham et al.

(10) Patent No.: US 10,726,355 B2
(45) Date of Patent: Jul. 28, 2020

(54) PARENT COMPANY INDUSTRY CLASSIFIER

(71) Applicant: Microsoft Technology Licensing, LLC, Redmond, WA (US)

(72) Inventors: Dan Shacham, Sunnyvale, CA (US); Uri Merhav, Rehovot (IL); Zhanpeng Fang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1023 days.

(21) Appl. No.: 15/169,255

(22) Filed: May 31, 2016

(65) Prior Publication Data
US 2017/0344902 A1 Nov. 30, 2017

(51) Int. Cl.
*G06N 20/00* (2019.01)
*G06Q 50/00* (2012.01)
*G06F 16/951* (2019.01)

(52) U.S. Cl.
CPC ........... *G06N 20/00* (2019.01); *G06F 16/951* (2019.01); *G06Q 50/01* (2013.01)

(58) Field of Classification Search
CPC combination set(s) only.
See application file for complete search history.

(56) References Cited

U.S. PATENT DOCUMENTS

| | | | |
|---|---|---|---|
| 9,886,498 B2* | 2/2018 | Goel | G06F 16/215 |
| 9,886,651 B2* | 2/2018 | Merhav | G06K 9/6277 |
| 10,152,550 B2* | 12/2018 | Ho | G06F 16/9535 |
| 10,255,586 B2* | 4/2019 | Shacham | G06Q 10/1053 |
| 10,339,612 B2* | 7/2019 | Merhav | G06Q 50/01 |
| 10,380,458 B2* | 8/2019 | Merhav | G06K 9/6267 |
| 10,380,480 B2* | 8/2019 | Merhav | G06N 3/084 |
| 10,459,901 B2* | 10/2019 | Merhav | G06F 16/2228 |
| 10,586,157 B2* | 3/2020 | Merhav | G06F 16/2228 |
| 2005/0197954 A1* | 9/2005 | Maitland | G06Q 10/0631 705/39 |
| 2017/0140297 A1* | 5/2017 | Karumanchi | G06Q 10/063 |

OTHER PUBLICATIONS

Du et al., "Improving Supervised Classification Using Information Extraction" Publication Year 2015.*

* cited by examiner

*Primary Examiner* — Michael B Holmes
(74) *Attorney, Agent, or Firm* — Schwegman Lundberg & Woessner, P.A.

(57) ABSTRACT

In an example embodiment, a solution that automatically predicts an industry for a candidate company is provided. An existing industry classifier is trained using a first machine learning algorithm, the first machine learning algorithm taking as input first training data and existing industries listed in an industry taxonomy. A new industry classifier is trained using a second machine learning algorithm, the second machine learning algorithm taking as input second training data and new industries listed in an industry taxonomy. Then the candidate company is fed into the existing industry classifier, producing one or more predicted existing industries corresponding to the candidate company. The candidate company is also fed into the new industry classifier, producing one or more predicted new industries corresponding to the candidate company. One or more final predicted industries are selected from among the one or more predicted existing industries and the one or more predicted new industries.

17 Claims, 10 Drawing Sheets

Hugh Johnson
Senior Director at XYZ
Greater New York City Area | Financial Services Current  XYZ, Inc.
Previous ABS Corporation
Education University of California, Los Angeles

[Connect] Send Hugh InMail ▶

2nd

326 Connections

Experience

Senior Director - Commodities Risk
XYZ
2013 - Present (2 years)

Top Skills

| 19 | Commodity |
| 12 | Market Risk |
| 9 | Commodity Markets |
| 9 | Derivatives |

*FIG. 5*

PARENT COMPANY INDUSTRY CLASSIFIER

TECHNICAL FIELD

The present disclosure generally relates to computer technology for solving technical challenges in machine learning. More specifically, the present disclosure relates to using classifiers to predict industries for companies.

BACKGROUND

The rise of the Internet has occasioned two disparate phenomena: the increase in the presence of social networks, with their corresponding member profiles visible to large numbers of people, and the increase in the use of these social networks to perform searches for people and companies. It is common for companies to be listed in one or more industries in profiles of these social networks. These industries are generally selected from an industry taxonomy, namely a data structure maintained by the social networking service. This industry taxonomy may include a hierarchical organization of possible industries. For example, an industry category of "Information Technology" in the industry taxonomy may have sub-categories of "Computer Software", "Computer Hardware", and "Computer Networking". The industry taxonomy may organize the sub-categories as children of a parent node corresponding to "Information Technology." There may be many layers of categories and subcategories in the industry taxonomy.

Typically an industry corresponding to a company will be determined by the company itself when the company establishes a profile page. Thus, for example, company XYZ, when creating a profile page, may select the "Information Technology" industry along with the sub-categories of "Computer Software" and "Computer Hardware," electing not to select "Computer Networking." Alternatively, third parties, such as administrators of the social networking service, can assign industries to companies when the profile pages are established.

One problem that arises, however, is that the industry a company practices in may shift over time, and yet companies (and third parties) will rarely manually update the profile page to reflect these changes. For example, if Company XYZ later begins to develop products related to "Computer Networking," nobody has updated the profile to reflect that the company now practices in the "Computer Networking" industry, and thus searches made for companies or people in the "Computer Networking industry" will not return results pertaining to Company XYZ or its employees, despite the fact that such results would now be relevant.

Another problem that arises is that industry categories and sub-categories may evolve over time. Specifically, new industries arise all the time, and thus it is important for new categories and subcategories of industries to be applied to existing companies, if relevant. Yet, once again, companies (and third parties) rarely manually update the profile page to reflect the additions of new industries, even if the underlying industry taxonomy has been updated with the new categories or subcategories.

BRIEF DESCRIPTION OF THE DRAWINGS

Some embodiments of the technology are illustrated, by way of example and not limitation, in the figures of the accompanying drawings.

FIG. 5 is a diagram illustrating additional sample training data in accordance with an example embodiment.

DETAILED DESCRIPTION

Overview

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, multiple computer implemented classifiers are used as part of a machine learning solution to predict industries for companies. This allows for periodic updating of industries listed in profiles or other documents for companies without the need for human intervention. It should be noted that while this document may use the term "company" or "companies", these terms are not meant to imply any particular sort of structure or characteristic for an organization. In other words, the term "company" shall be interpreted broadly to cover any type of organization, whether set up for profit, non-profit, educational, or governmental functions.

Figure 1:
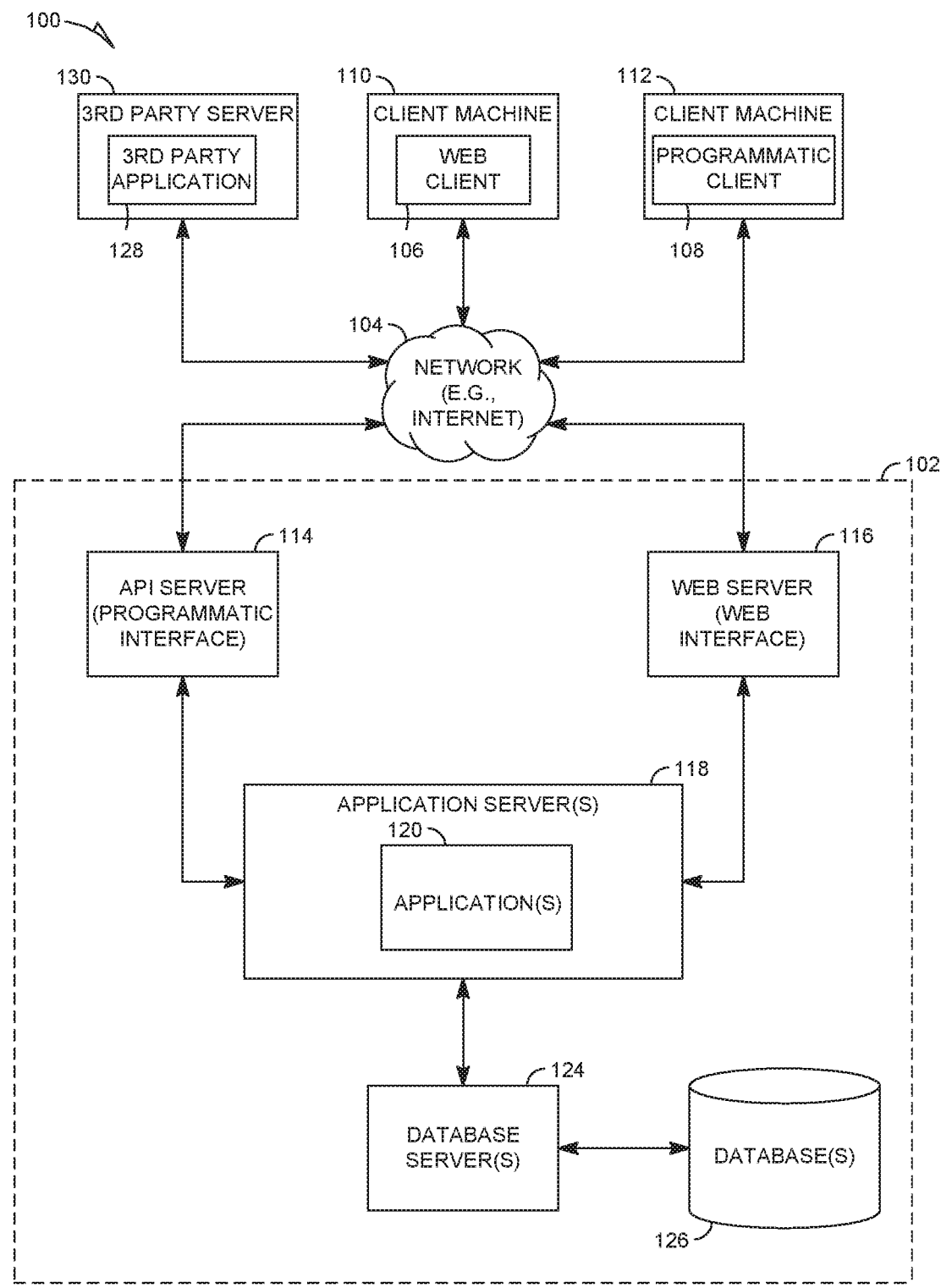
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
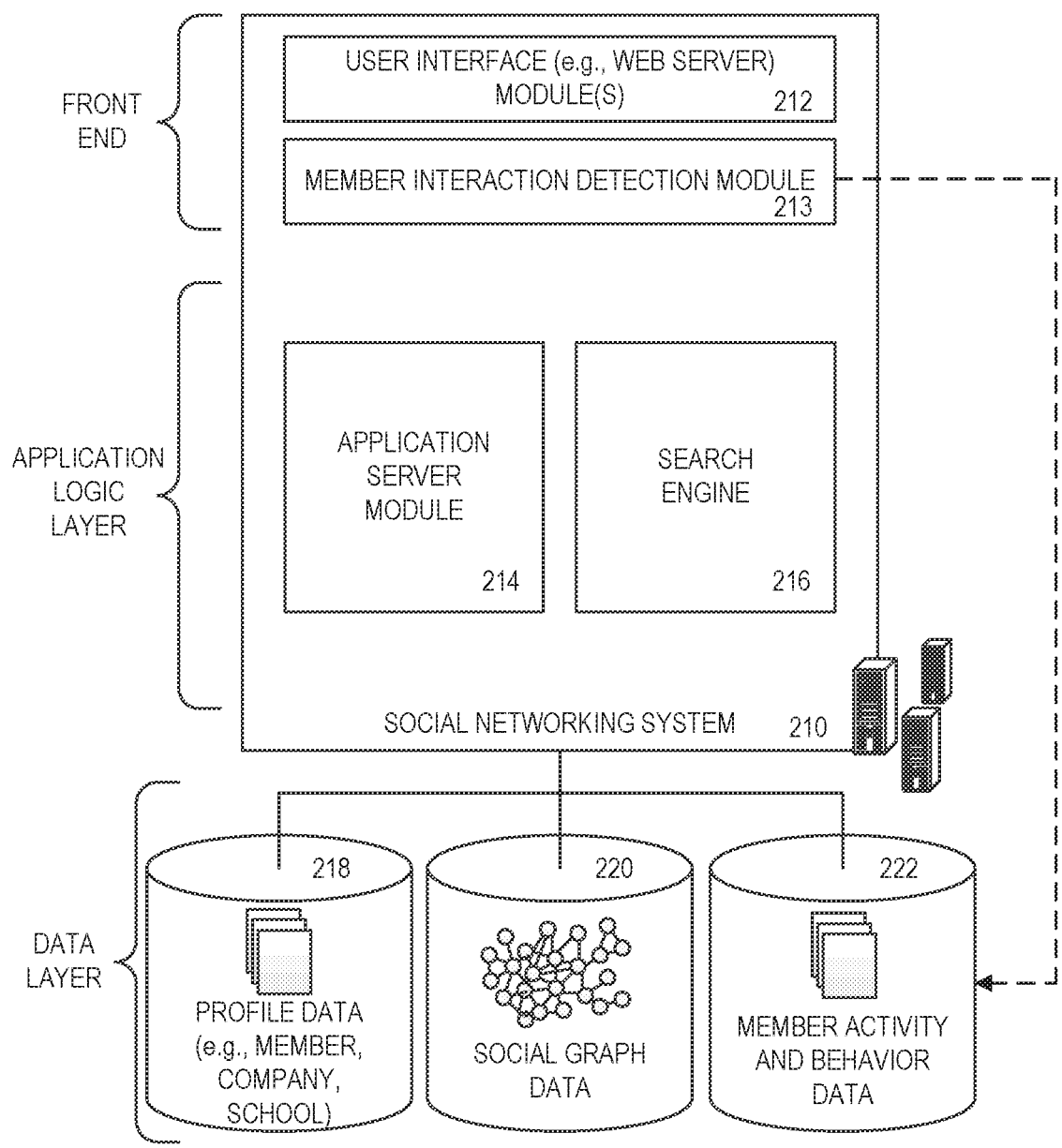
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service system 210, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
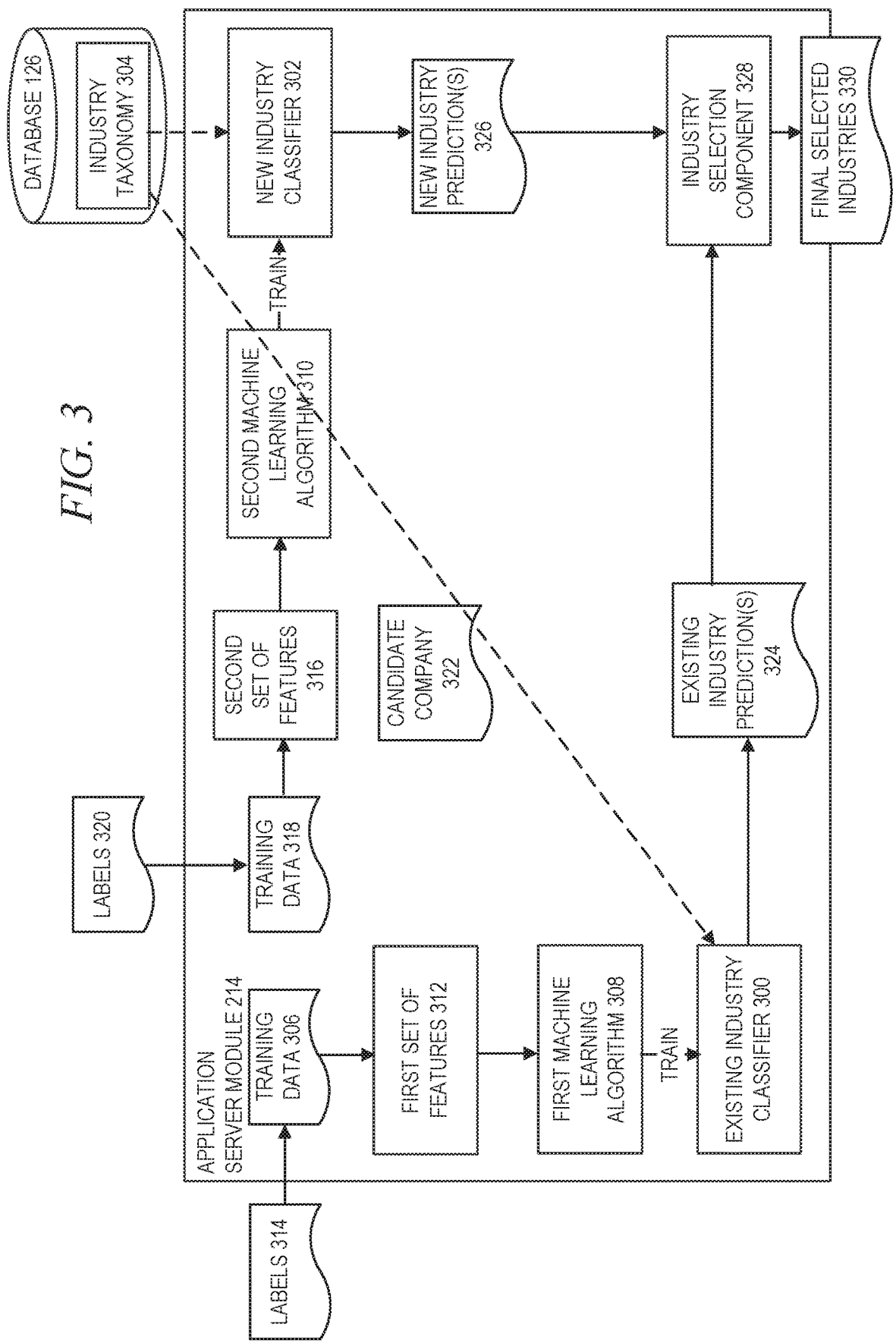
FIG. 3 is a block diagram illustrating the application server module of FIG. 2 in more detail in accordance with an example embodiment.

FIG. 3 is a block diagram illustrating application server module 214 of FIG. 2 in more detail. While in many embodiments the application server module 214 will contain many subcomponents used to perform various different actions within the social networking system 210, in FIG. 3 only those components that are relevant to the present disclosure are depicted.

Two separate classifiers are presented in FIG. 3. The first is known as the existing industry classifier 300. The second is known as the new industry classifier 302. Each of these classifiers 300, 302 is trained separately, although some overlap in the training data and/or features may exist between the classifiers 300, 302. Each of these classifiers 300, 302 is trained to utilize an industry taxonomy 304 stored in database 126, although each uses this industry taxonomy 304 differently. Specifically, the industry taxonomy 304 may be periodically changed. These changes may include, for example, adding new industries in the taxonomy 304, typically as subcategories of existing categories or subcategories in the industry taxonomy 304. For purposes of this disclosure, the industry taxonomy 304 may be thought of as comprising two types of industries: existing industries and new industries. The separation between these two categories is based on snapshots of the industry taxonomy 304 at two (or more) different time periods. In a simplistic case, any industries present in the industry taxonomy 304 at time $t_1$ may be considered to be existing industries, while any industries present in the industry taxonomy 304 at a later time $t_2$ may be considered to be new industries. In practice, in some example embodiments, an industry that the existing industry classifier 300 has been trained on may be considered an existing industry, and all other industries may be considered new industries until such time that the existing industry classifier 300 has been trained on them.

One technical challenge that is encountered is that it is difficult to provide significant training data 306 on new industries, as often there simply has not been enough usage yet of profiles listing those new industries to garner either the feature data or labels desired for such training data 306. This is often referred to as a "cold start" problem, at least with respect to the new industries.

The existing industry classifier 300 is trained via a first machine learning algorithm 308 to classify a candidate company into an existing industry. The new industry classifier 302, on the other hand, is trained by a second machine learning algorithm 310 to classify a candidate company into a new industry.

The first machine learning algorithm 308 utilizes a first set of features 312 extracted from the training data 306 to train the existing industry classifier 300. Specifically, labels 314 are provided for the training data 306 indicating appropriate industries for companies in the training data 306, and the first set of features 312 for the labeled training data 306 are fed to the first machine learning algorithm 308 to train the existing industry classifier 300.

The first machine learning algorithm 308 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors).

The new industry classifier 302 utilizes a second set of features 316 extracting from training data 318. In some instances the training data 318 may be the same as training data 306 or there may be some, but not complete, overlap. Labels 320 may be provided for training data 318 indicating appropriate industries for companies in the training data 318, and the second set of features 316 for the labeled training data 318 are fed to the second machine learning algorithm 310 to train the new industry classifier 302.

The second machine learning algorithm 310 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a binary logistical regression model is used.

The first set of features 312 may include different feature types than the second set of features 316 because certain feature types are unlikely to be available for new industries to the industry taxonomy 304. Specifically, no direct member profile information may be available (because the industry is new and hasn't been listed in profiles yet, or at least not enough profiles to train a model on), and no direct member activity information may be available (because the industry is new and hasn't been searched on or had results clicked on yet, or at least there is not enough such information to train a model on). In some examples embodiments, the first set of features 312 may be a superset of the second set of features 316, in that the first set of features 312 includes all feature types in the second set of features 316 as well as additional feature types not available in the second set of features 316.

Figure 4:
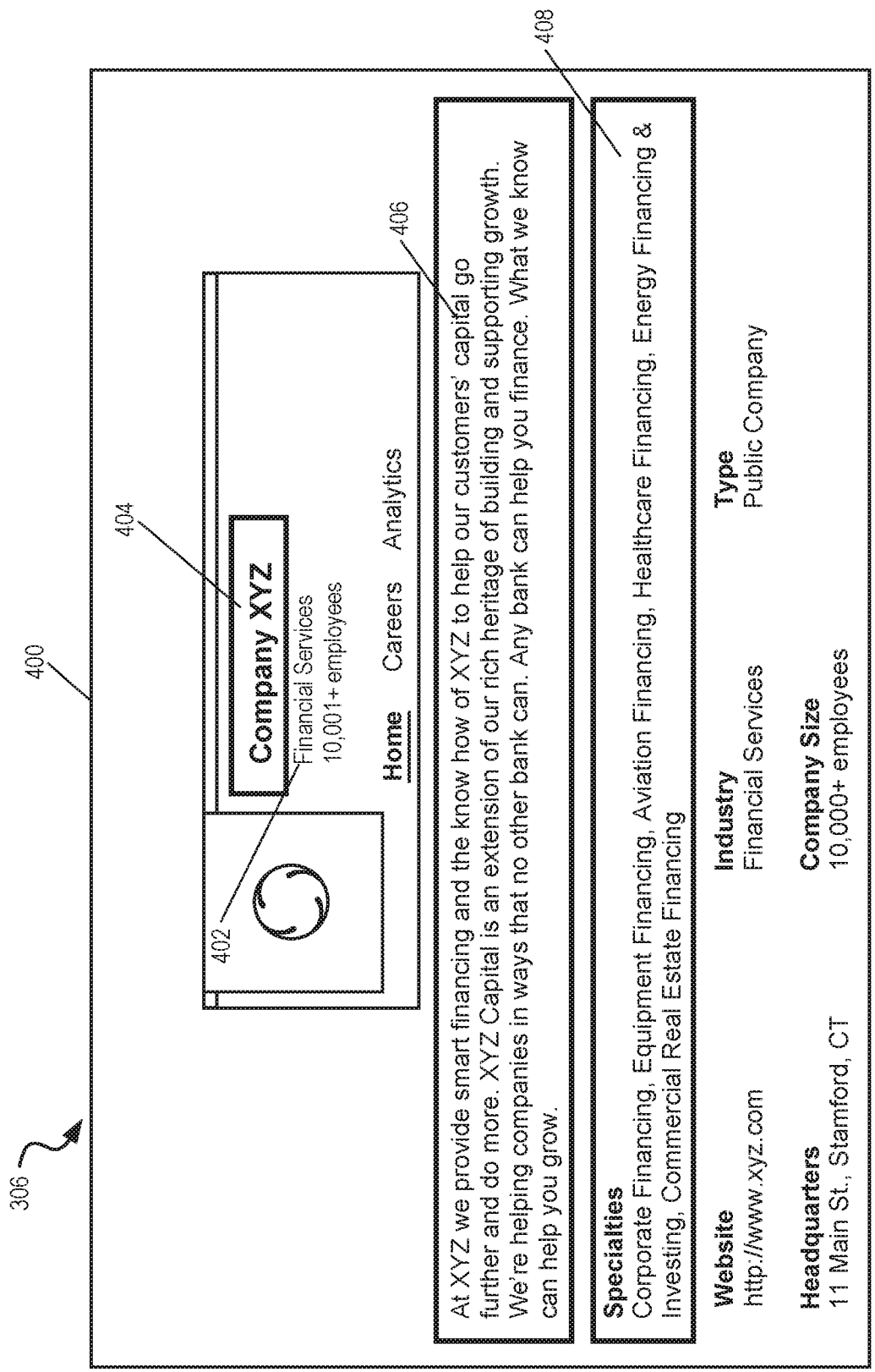
FIG. 4 is a diagram illustrating sample training data in accordance with an example embodiment.

The first set of features 312 may be derived from training data 306 that includes labels 314 derived from the data itself, or labels 314 that have been assigned by a human assisting with the training process. FIG. 4 is a diagram illustrating sample training data 306 in accordance with an example embodiment. Here, the training data is a profile 400 for Company XYZ. Notably, this profile 400 is a company profile that contains an explicit identification of an existing industry 402 in the industry taxonomy 304, as well as a company name 404, description 406, and tags 408. The existing industry 402 may be used as a label for this profile 400, and the company name 404, description 406, and tags 408 are all features that may be extracted and analyzed as part of the first set of features 312 by the first machine learning algorithm 308.

FIG. 5 is a diagram illustrating additional sample training data 306 in accordance with an example embodiment. Here, the training data is a profile 500 for user John Doe. The user has listed work experience which includes an explicit identification of an existing industry 502, as well as a job title 504 and a list of skills 506. The existing industry 502 may be used as a label for this profile 500, and the job title 504 and list of skills 506 are features that may be extracted and analyzed as part of the first set of features 312 by the first machine learning algorithm 308.

Such labels 314 are not available for new industries, as the profiles 400, 500 would not list a new industry yet. As such, the second set of features 316 may need to utilize different resources in order to help model an existing industry for such profiles 400, 500. In an example embodiment, information from training data 318 may be extracted and used to search one or more third party information sources from which related industries can be obtained An example of a third party information source is an online public wiki (a network-based information repository that allows collaborative modification of its content and structure). A search on such a third party information source on, for example, an existing industry 402, 502, a company name 404, a job title 504, one or more skills 506, terms from a description 406, and/or tags 408 may result in wiki entries that include information about related industries. For example, a public wiki search on the existing industry "Financial Services" may yield an entry that includes numerous mentions of the banking industry. As such, "Banking" may be used as a label for training data 318 even though it was never explicitly listed in the profiles 400, 500. Thus, the existing industry classifier 300 is trained to learn that a company name that is listed in profiles having "Financial Services" in them also may pertain to the industry "Banking."

Basic features available in both the first and second set of features 312, 316 include, for example, variations on an explicitly provided industry name (e.g., "Marketing and Advertising" may be changed to "market" and "advertis" to pick up more results), keyword generation by rules and word entropy (e.g., a rule saying that a "/" represents a connector, and thus the keywords "primary/secondary education" may be changed to "primary education OR secondary education", or alternatively the variations "primar educ OR secondar educ"). These features may be extracted from terms in company tags, descriptions, and titles as described above with respect to FIGS. 4 and 5. Additionally, some features may be calculated from other features and aggregated across multiple pieces of data. For example, member data may be aggregated to find the top titles and skills working for a particular company, and those titles and skills may be used by the first machine learning algorithm to train the existing industry classifier.

Additionally, more complex features may be obtained. One such more complex feature may be a Word2Vec feature analyzed on some available input data, such as profile descriptions, tags, or third party information sources such as public wiki entries. Word2Vec is a group of related models used to produce word embedding. These models are shallow, two-layer neural networks that themselves are trained to reconstruct linguistic contents of words—the network is shown a word and guesses which words occurred in adjacent positions in an input text. The ordering of the remaining words is considered not important (also known as a bag of words assumption). After training, Word2Vec models can be used to map each word to a vector of many elements, which represents the word's relation to other words. This vector is the neural network's hidden layer.

Specifically, two probabilities may be determined. The first a probability for a given industry based on a Word2Vec model as follows:

$$Pi = \sum_{w \in W_i} \alpha_w word2vec(w)$$

The second is a probability for a given non-industry term based on a Word2Vec model as follows:

$$P_c = \sum_{w \in W_c} \beta_w word2vec(w)$$

$\alpha_w$ and $\beta_w$ are weights assigned to w. In an example embodiment, these weights may be based on inverse document frequency. The similarity between a given industry and company may then be calculated as the cosine similarity cos $(p_i, p_c)$.

Thus, for example, the industry "computer networking" may have a cosine similarity of 0.566 to the term "backup", a cosine similarity of 0.546 to the term "WAN," a cosine similarity of 0.544 to the term "Router", a cosine similarity of 0.486 to the term "troubleshoot", a cosine similarity of 0.485 to the term "VPN," a cosine similarity of 0.473 to the term "Network security" and a cosine similarity of 0.462 to the term "Virus." Based on this cosine similarity, some or all of these terms may be selected to be candidates for new industries.

Once the classifiers 300, 302 have been trained, they may be used to predict an industry for a candidate company 322 at runtime. It should be noted that such a use can actually happen at a variety of different times. Indeed, whenever a system wishes to predict an industry for a candidate company 322, the classifiers 300, 302 may be used to make such a prediction. In some example embodiments, this may occur when a change is made to a profile. In other example embodiments, these predictions may be made as a batch on a periodic basis. For example, all existing companies in a company taxonomy (not pictured) may be periodically passed through the classifiers 300, 302 to predict new industries and/or industry changes for the companies, and corresponding profiles may then be automatically updated to reflect such changes. Thus, the definition of "runtime" shall be interpreted broadly to include such batch operation times. In other words, "runtime" shall include both online and offline uses of the classifiers 300, 302.

The candidate company 322 may be passed to both the existing industry classifier 300 and the new industry classifier 302. The existing industry classifier 300 produces one or more existing industry predictions 324 for the candidate company 322, while the new industry classifier 302 produces one or more new industry predictions 326 for the candidate. The one or more existing industry predictions 324 reflect existing industries in the industry taxonomy 304 that the existing industry classifier 300 predicts apply to the candidate company 322. The one or more new industry predictions 326 reflect new industries in the industry taxonomy 304 that the new industry classifier 302 predicts apply to the candidate company 322. The one or more existing industry predictions 324 and the one or more new industry predictions 326 may be passed to an industry selection component 328 that selects from among the predictions 324, 326 to output one or more final selected industries 330 for the candidate company 322.

In some example embodiments, one or both of the classifiers 300, 302 may also output a confidence score for each of the one or more industry predictions 324, 326, respectively, that it outputs. This confidence score reflects the corresponding classifier's 300, 302 confidence level in the prediction. For example, a confidence score may be generated between 0.0 and 1.0, with 0.0 representing no confidence in the prediction and 1.0 representing full confidence in the prediction. The industry selection component 328 may then use these confidence scores in selecting from among the predictions 324, 326.

Figure 6:
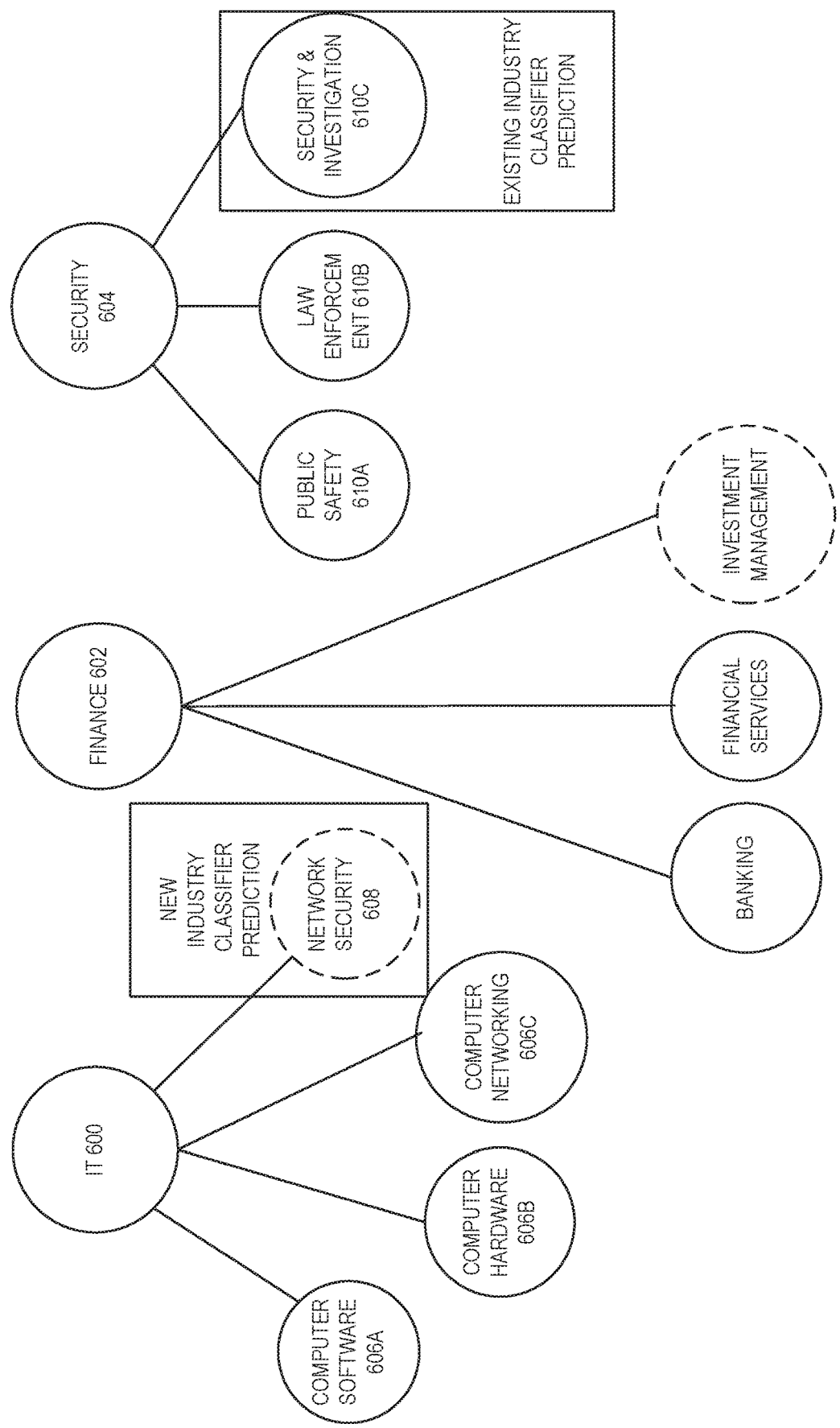
FIG. 6 is diagram illustrating an example of operation of the industry selection component in accordance with an example embodiment.

FIG. 6 is diagram illustrating an example of operation of the industry selection component 328 of FIG. 3 in accordance with an example embodiment. Here, a portion of an industry taxonomy 304 is depicted. The industry taxonomy portion includes existing industry categories 600, 602, and 604. Each of the existing industry categories 600, 602, 604 include one or more existing and/or new subcategories. For example, existing industry category "IT" 600 includes existing the subcategory "Computer Software" 606A, existing subcategory "Computer Hardware" 606B, existing subcategory "Computer Networking" 606C, and a new subcategory "Network Security" 608. Existing industry category "Security" 604 includes an existing subcategory "Public Safety" 610A, existing subcategory "Law Enforcement" 610B, and existing subcategory "Security & Investigation" 610C.

In this example, the existing industry classifier 300 has predicted an existing industry of "Security & Investigation" 610C for a company called "Honest Security," while the new industry classifier 302 has predicted a new industry of "Network Security" 608 for the same company. The industry selection component 328 selects from among these predictions. Specifically, in an example embodiment, the industry selection component 328 uses information about whether or not the predictions from the different classifiers 300, 302 share a mutual parent (e.g., are in the same category 600, 602, 604 or not) to aid in its determination of which prediction to choose. In an example embodiment, the industry selection component 328 uses confidence scores output by the different classifiers 300, 302 in this selection as well. Thus, in this example, the existing industry classifier 300 has predicted "Security & Investigation" 610C with a high degree of confidence, and "Security & Investigation" 610C does not share a mutual parent with "Network Security" 608. As such, both factors trend towards the industry selection component 328 selecting "Security & Investigation" 610C as the industry for "Honest Security" but not selecting "Network Security" 608. If the confidence score of the existing industry classifier 300, however, had been low, then the industry selection component 328 may have also selected new industry "Network Security" 608. Likewise, if "Network Security" 608 had been in the same industry category as "Security & Investigation" 610C then the industry selection component 328 may have also selected new industry "Network Security" 608.

Figure 7:
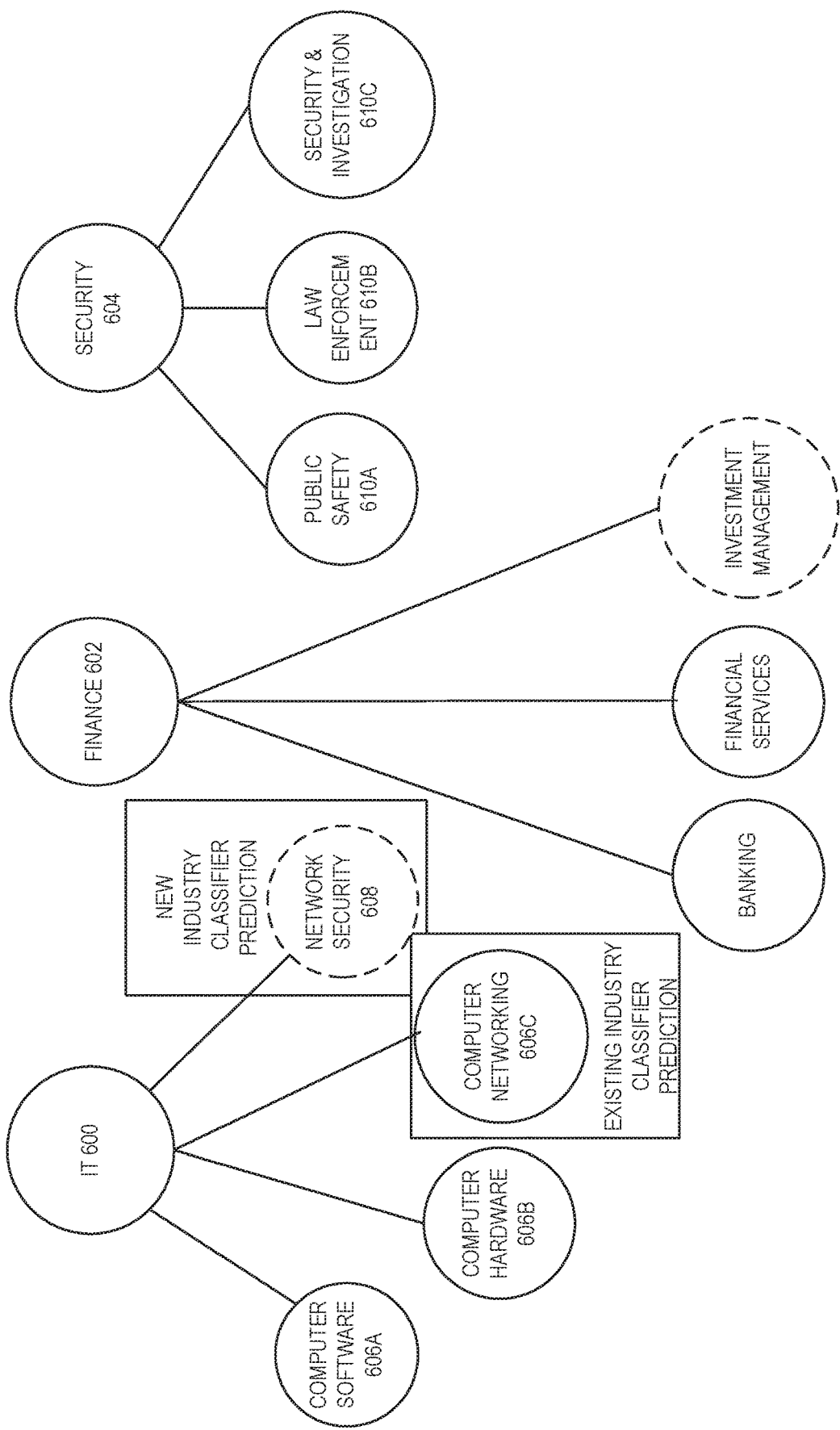
FIG. 7 is diagram illustrating an example of operation of the industry selection component in accordance with another example embodiment.

FIG. 7 is diagram illustrating an example of operation of the industry selection component 328 in accordance with another example embodiment. Here, with the same industry taxonomy 304, the existing industry classifier 300 has predicted an industry of "Computer Networking" 606C for a company called "Safe Networks," while the new industry classifier 302 has predicted an industry of "Network Security" 608 for the same company. Since these predictions share the same parent ("IT" 600), the industry selection component 328 selects both of them as industries for "Safe Networks."

Referring back to FIG. 3, the output from the industry selection component 328, namely the final selected industries 330, may be used not only for whatever purposes the predictions are being made for (e.g., updating company or member profiles with new industries for companies), but also may be used as feedback for the second machine learning algorithm 310. Specifically, the second machine learning algorithm 310 may use the final selected industries 330 as label data to help train and/or calibrate the new industry classifier 302.

Figure 8:
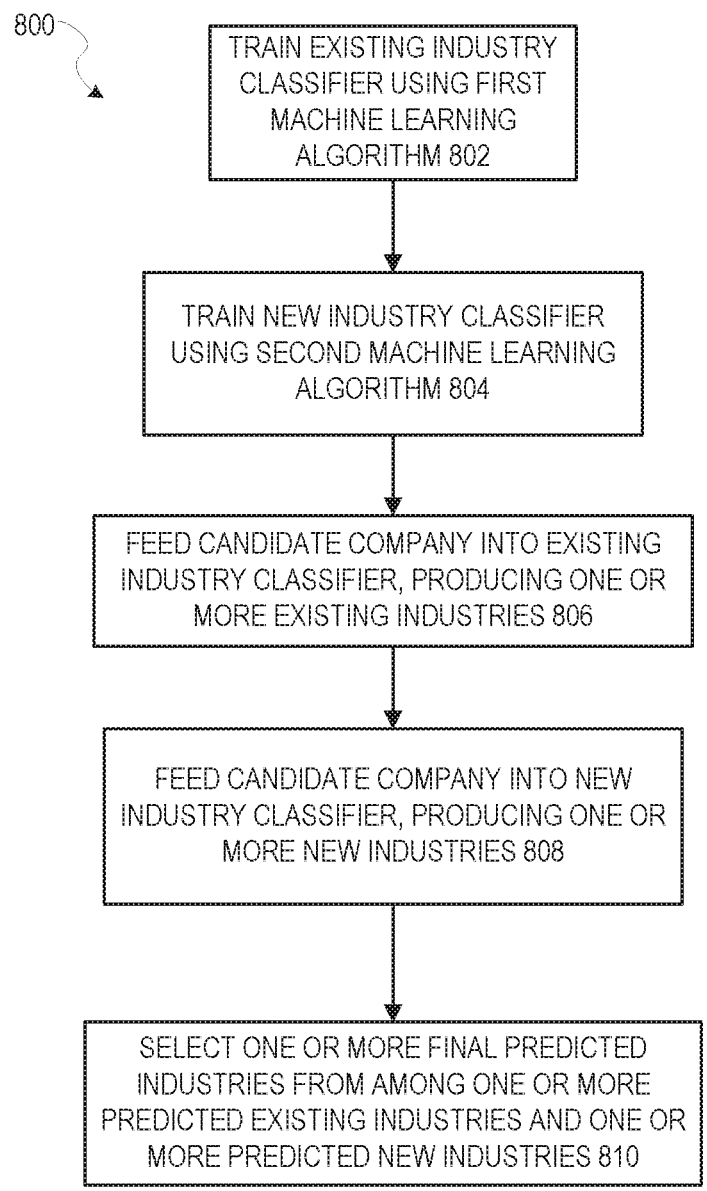
FIG. 8 is a flow diagram illustrating a method for automatically predicting an industry for a candidate company in accordance with an example embodiment.

FIG. 8 is a flow diagram illustrating a method 800 for automatically predicting an industry for a candidate company in accordance with an example embodiment. At operation 802, an existing industry classifier (e.g., existing industry classifier 300) is trained using a first machine learning algorithm (e.g., first machine learning algorithm 308). The first machine learning algorithm takes as input first training data (e.g., training data 306) and existing industries listed in an industry taxonomy (e.g., industry taxonomy 304). This may include extracting a first set of features from the first training data. Specifically, an existing industry may be extracted from the first training data and used as a label (e.g., a label 314) and corresponding information fields may be extracted from the first training data and used as features (e.g., first set of features 312) for the first machine learning algorithm. At operation 804, a new industry classifier (e.g., new industry classifier 302) is trained using a second machine learning algorithm (e.g., second machine learning algorithm 310). The second machine learning algorithm takes as input second training data (e.g., training data 318) and new industries listed in an industry taxonomy (e.g., industry taxonomy 304). This may include extracting a second set of features (e.g., second set of features 316) from the second training data. Specifically, a new industry and other information may be extracted from the second training data and used as features for the second machine learning algorithm, perhaps in addition to searching terms in the existing industry and other information on one or more third party information sources to obtain candidate new industries for consideration in the new industry classifier.

At operation 806, the candidate company is fed into the existing industry classifier, producing one or more predicted existing industries (e.g., existing industry prediction(s) 324) corresponding to the candidate company. At operation 808, the candidate company is fed into the new industry classifier, producing one or more predicted new industries (e.g., new industry prediction(s) 326) corresponding to the candidate company. At operation 810, one or more final predicted industries are selected (e.g., final selected industries 330) from among the one or more predicted existing industries and the one or more predicted new industries. This may include eliminating any of the one or more predicted new industries that do not share a parent category in the industry taxonomy with at least one of the one or more predicted existing industries.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 9:
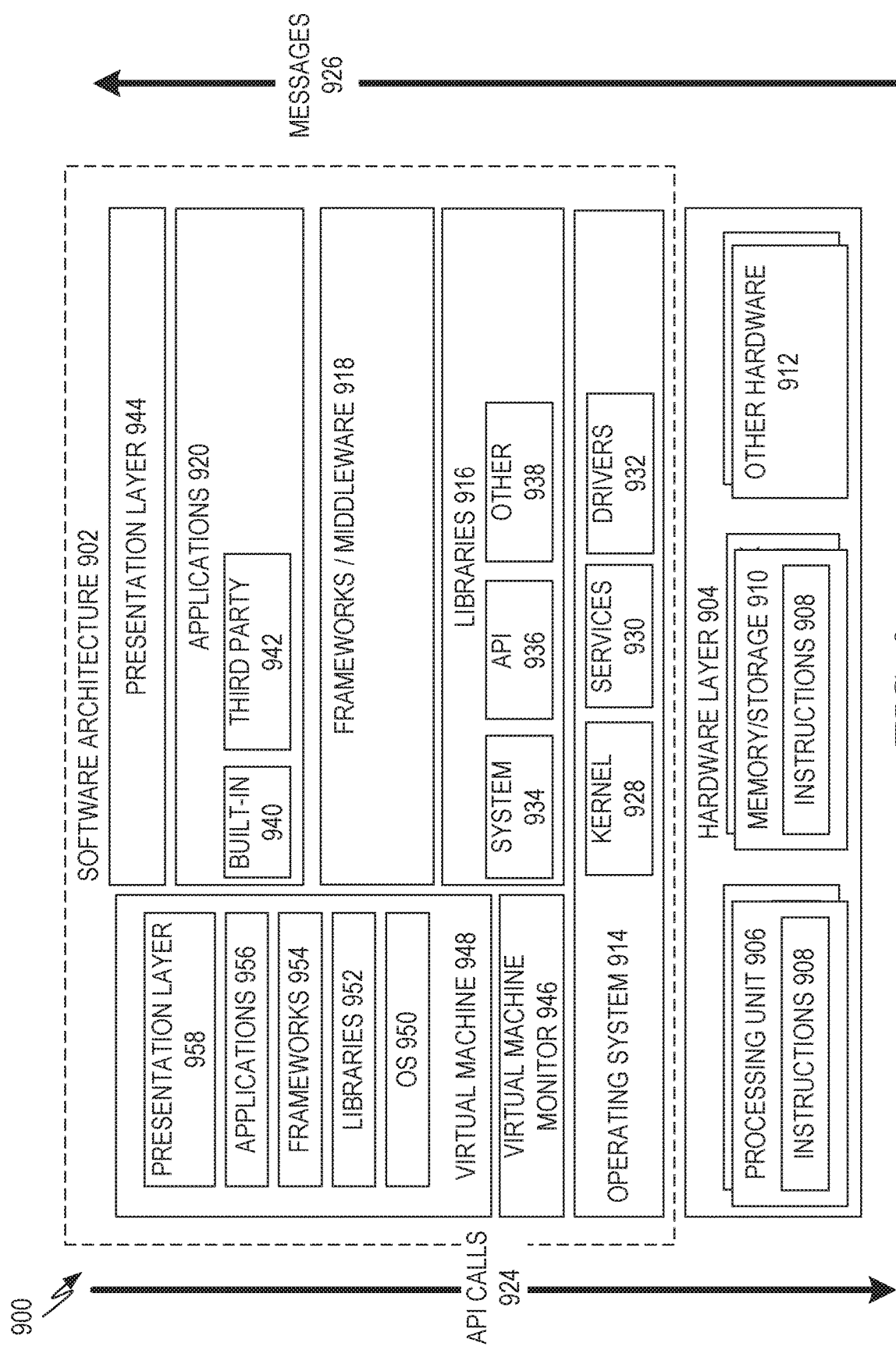
FIG. 9 is a block diagram illustrating a representative software architecture, which may be used in conjunction with various hardware architectures herein described.

FIG. 9 is a block diagram 900 illustrating a representative software architecture 902, which may be used in conjunction with various hardware architectures herein described. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory/storage 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory and/or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and a presentation layer 944. Operationally, the applications 920 and/or other components within the layers may invoke API calls 924 through the software stack and receive responses, returned values, and so forth, illustrated as messages 926, in response to the API calls 924. The layers illustrated are representative in nature and not all software architectures have all layers. For example, some mobile or special purpose operating systems may not provide a layer of frameworks/middleware 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third party applications 942. Examples of representative built-in applications 940 may include, but are not limited to, a contacts application, a browser application, a book reader application, a location application, a media application, a messaging application, and/or a game application. The third party applications 942 may include any of the built-in applications 940 as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as the operating system 914 to facilitate functionality described herein.

The applications 920 may utilize built-in operating system 914 functions (e.g., kernel 928, services 930, and/or drivers 932), libraries 916 (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with a user.

Some software architectures utilize virtual machines. In the example of FIG. 9, this is illustrated by a virtual machine 948. A virtual machine creates a software environment where applications/modules can execute as if they were executing on a hardware machine (such as the machine 1000 of FIG. 10, for example). A virtual machine is hosted by a host operating system (e.g., operating system 914 in FIG. 9) and typically, although not always, has a virtual machine monitor 946, which manages the operation of the virtual machine 948 as well as the interface with the host operating system (e.g., operating system 914). A software architecture executes within the virtual machine 948, such as an operating system 950, libraries 952, frameworks/middleware 954, applications 956, and/or a presentation layer 958. These layers of software architecture executing within the virtual machine 948 can be the same as corresponding layers previously described or may be different.

Example Machine Architecture and Machine-Readable Medium

Figure 10:
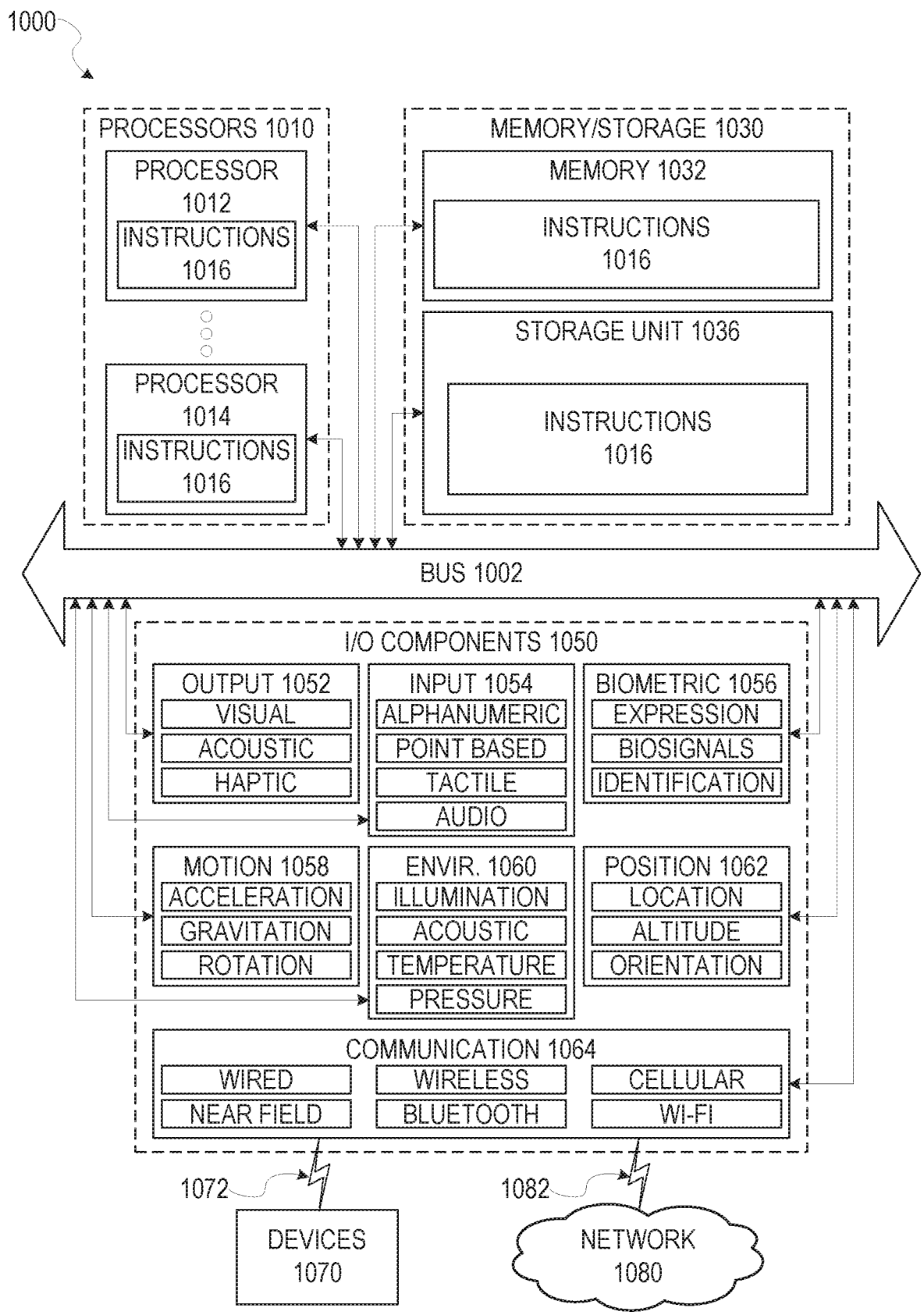
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or other suitable device to interface with the network 1080. In further examples, the communication components 1064 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method for automatically predicting an industry for a candidate company, the method comprising:
    training an existing industry classifier using a first machine learning algorithm, the first machine learning algorithm taking as input first training data and existing industries listed in an industry taxonomy, wherein the existing industries are industries contained in the industry taxonomy at a first time;
    training a new industry classifier using a second machine learning algorithm, the second machine learning algorithm taking as input second training data and new industries listed in the industry taxonomy, wherein the new industries are industries contained in the industry taxonomy at a second time subsequent to the first time, but that were not contained in the industry taxonomy at the first time;
    inputting the candidate company into the existing industry classifier, producing one or more predicted existing industries corresponding to the candidate company;
    inputting the candidate company into the new industry classifier, producing one or more predicted new industries corresponding to the candidate company; and
    selecting one or more final predicted industries from among the one or more predicted existing industries and the one or more predicted new industries, wherein the selecting includes eliminating any of the one or more predicted new industries, from the one or more final predicted industries selected, that do not share a parent industry with at least one of the one or more predicted existing industries.

2. The method of claim 1, wherein the existing industry classifier is trained to output a confidence score for each of the one or more predicted existing industries and the selecting includes using the confidence score for each of the one or more predicted existing industries.

3. The method of claim 1, wherein the first and second machine learning algorithms are binary logistic regression algorithms.

4. The method of claim 1, wherein the first training data includes profiles from a social networking service, each profile including an existing industry that is extracted and used as a label for the profile when input to the first machine learning algorithm, each profile further including one or more additional fields from which one or more features may be extracted and used in the training by the first machine learning algorithm.

5. The method of claim 4, wherein, for a profile from the social networking service that is a member profile, the additional fields include job title and one or more skills.

6. The method of claim 4, wherein, for a profile from the social networking service that is a company profile, the additional fields include a company name, description, and one or more tags.

7. The method of claim 1, wherein the second training data is augmented by extracting terms from fields of profiles in the second training data and using the extracted terms to search one or more third party information sources for new industry candidates.

8. The method of claim 7, wherein the second machine learning algorithm utilizes a Word2Vec model to select from among the new industry candidates.

9. A system comprising:
a computer-readable medium having instructions stored there on, which, when executed by a processor, cause the system to:
train an existing industry classifier using a first machine learning algorithm, the first machine learning algorithm taking as input first training data and existing industries listed in an industry taxonomy, wherein the existing industries are industries contained in the industry taxonomy at a first time;
train a new industry classifier using a second machine learning algorithm, the second machine learning algorithm taking as input second training data and new industries listed in the industry taxonomy, wherein the new industries are industries contained in the industry taxonomy at a second time subsequent to the first time, but that were not contained in the industry taxonomy at the first time;
input the candidate company into the existing industry classifier, producing one or more predicted existing industries corresponding to the candidate company;
input the candidate company into the new industry classifier, producing one or more predicted new industries corresponding to the candidate company; and
select one or more final predicted industries from among the one or more predicted existing industries and the one or more predicted new industries, wherein the selecting includes eliminating any of the one or more predicted new industries, from the one or more final predicted industries selected, that do not share a parent industry with at least one of the one or more predicted existing industries.

10. The system of claim 9, wherein the existing industry classifier is trained to output a confidence score for each of the one or more predicted existing industries and the selecting includes using the confidence score for each of the one or more predicted existing industries.

11. The system of claim 9, wherein the first and second machine learning algorithms are binary logistic regression algorithms.

12. A non-transitory machine-readable storage medium comprising instructions, which when implemented by one or more machines, cause the one or more machines to perform operations comprising:
training an existing industry classifier using a first machine learning algorithm, the first machine learning algorithm taking as input first training data and existing industries listed in an industry taxonomy, wherein the existing industries are industries contained in the industry taxonomy at a first time;
training a new industry classifier using a second machine learning algorithm, the second machine learning algorithm taking as input second training data and new industries listed in the industry taxonomy, wherein the new industries are industries contained in the industry taxonomy at a second time subsequent to the first time, but that were not contained in the industry taxonomy at the first time;
inputting the candidate company into the existing industry classifier, producing one or more predicted existing industries corresponding to the candidate company;
inputting the candidate company into the new industry classifier, producing one or more predicted new industries corresponding to the candidate company; and
selecting one or more final predicted industries from among the one or more predicted existing industries and the one or more predicted new industries, wherein the selecting includes eliminating any of the one or more predicted new industries, from the one or more final predicted industries selected, that do not share a parent industry with at least one of the one or more predicted existing industries.

13. The non-transitory machine-readable storage medium of claim 12, wherein the existing industry classifier is trained to output a confidence score for each of the one or more predicted existing industries and the selecting includes using the confidence score for each of the one or more predicted existing industries.

14. The non-transitory machine-readable storage medium of claim 12, wherein the first and second machine learning algorithms are binary logistic regression algorithms.

15. The non-transitory machine-readable storage medium of claim 12, wherein the first training data includes profiles from a social networking service, each profile including an existing industry that is extracted and used as a label for the profile when input to the first machine learning algorithm, each profile further including one or more additional fields from which one or more features may be extracted and used in the training by the first machine learning algorithm.

16. The non-transitory machine-readable storage medium of claim 15, wherein, for a profile from the social networking service that is a member profile, the additional fields include job title and one or more skills.

17. The non-transitory machine-readable storage medium of claim 15, wherein, for a profile from the social networking service that is a company profile, the additional fields include a company name, description, and one or more tags.

* * * * *